United States Patent
Alexander

(10) Patent No.: US 10,292,060 B2
(45) Date of Patent: May 14, 2019

(54) AUTONOMOUS, POWER-DICTATED MESSAGE ROUTING FOR MULTI-HOP MESH NETWORK OUTAGE COMMUNICATIONS

(71) Applicant: COOPER TECHNOLOGIES COMPANY, Houston, TX (US)

(72) Inventor: Roger Kirk Alexander, Rockville, MD (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 267 days.

(21) Appl. No.: 15/292,584

(22) Filed: Oct. 13, 2016

(65) Prior Publication Data

US 2018/0109966 A1    Apr. 19, 2018

(51) Int. Cl.
| | | |
|---|---|---|
| H04L 12/58 | (2006.01) | |
| H04W 24/04 | (2009.01) | |
| H04L 12/24 | (2006.01) | |
| H04L 12/707 | (2013.01) | |
| H04W 84/18 | (2009.01) | |

(52) U.S. Cl.
CPC ......... *H04W 24/04* (2013.01); *H04L 41/0654* (2013.01); *H04L 45/22* (2013.01); *H04W 84/18* (2013.01); *Y02D 70/00* (2018.01); *Y02D 70/142* (2018.01); *Y02D 70/144* (2018.01); *Y02D 70/20* (2018.01); *Y02D 70/22* (2018.01); *Y02D 70/23* (2018.01)

(58) Field of Classification Search
None
See application file for complete search history.

(56) References Cited

U.S. PATENT DOCUMENTS

| | | | | |
|---|---|---|---|---|
| 7,124,151 B1 * | 10/2006 | Choi | ..................... | H04L 41/024 707/200 |
| 7,940,679 B2 | 5/2011 | Kelley et al. | | |
| 8,059,011 B2 | 11/2011 | Van Wyk et al. | | |
| 8,370,697 B2 | 2/2013 | Veillette | | |
| 8,483,111 B2 | 7/2013 | Todd et al. | | |
| 8,792,409 B2 | 7/2014 | Borleske et al. | | |

(Continued)

*Primary Examiner* — Zewdu A Beyen
(74) *Attorney, Agent, or Firm* — Eckert Seamans

(57) ABSTRACT

Methods and devices for facilitating communications in an ad-hoc multi-hop wireless network during outage conditions are described herein. In one exemplary embodiment, an initiating device attempts to send a communication to a target destination by first sending a synchronization request to an intermediate device using a unicast transmission. If the initiating device determines that the first synchronization request failed, a second synchronization request is sent to any potential candidate device neighbors using an anycast transmission protocol. The initiating device receives an acknowledgment message from at least one of those devices. The transmission of acknowledgment messages by potential candidate responders are prioritized in a self-organizing manner relating to priority indicator information conveyed in the anycast transmission. The acknowledgment message indicates that a device has accepted the anycast synchronization request and, after synchronizing with that device, the initiating device sends a communication to the destination via the responding device using a unicast transmission protocol.

19 Claims, 5 Drawing Sheets

(56) References Cited

U.S. PATENT DOCUMENTS

| | | |
|---|---|---|
| 8,908,536 B2 | 12/2014 | Hui et al. |
| 8,970,394 B2 | 3/2015 | Veillette |
| 9,001,676 B2 | 4/2015 | Hui et al. |
| 9,306,833 B2 | 4/2016 | Shaffer et al. |
| 2006/0045004 A1 | 3/2006 | Charzinski et al. |

* cited by examiner

AUTONOMOUS, POWER-DICTATED MESSAGE ROUTING FOR MULTI-HOP MESH NETWORK OUTAGE COMMUNICATIONS

BACKGROUND OF THE INVENTION

Field

The present invention generally relates to methods for routing communications in a multi-hop mesh network in the event of a power outage affecting routing devices within the network. Particularly, anycast message transmission protocols are used to dynamically and automatically establish efficient and energy available connection pathways for message routing between various devices in a network.

Background Information

A wireless mesh network is a communications network configured to route data between devices within the network where devices can make use of links between multiple alternative neighbors for routing traffic across the network. Mesh networks provide reliable network communications by taking advantage of diverse link connectivity between devices to establish optimal end-to-end paths between different source and destination points within the network. Through the use of dynamic routing protocols mesh networks are able to support continuous connectivity by adapting to changes in the availability of link connectivity between network devices.

A wireless mesh network is able to provide complete connectivity among network devices by allowing for multi-hop communications whereby a message between an originating source device and the intended destination device can be sent through multiple intermediate devices. The mesh network can be self-healing based on the ability to use diverse neighbor link connections to overcome individual link or device failures.

In a frequency hopping wireless mesh network the communications between connected neighbor devices take place over a series of radio frequency (RF) channels where the network devices following an initial synchronization phase communicate by transmitting and receiving communications using a pseudorandom sequence of frequencies.

In the utilities industry, mesh networks have been used to support the monitoring and control of various critical resources, such as electricity. In a "smart" electrical grid, for instance, various system devices (e.g., meters, transformers, other line sensor devices, etc.) are equipped with wireless communications device circuitry that allow for information exchange and remote access and control. This allows the system devices to be wirelessly connected and able to communicate with head end systems (HES), one another, and various other devices over a radio frequency medium. The communications devices act as part of a wireless mesh network supporting data relaying between devices as necessary for delivering information from an originating source to the intended destination, often a destination gateway device, which facilitates the interfacing of the system device with information or application servers, other networks, etc. Persons of ordinary skill in the art will recognize that smart grids usually include systems in which devices in the mesh network are connected to, and relies upon, the electrical grid as a primary source of power by being connected to electric feeder lines.

Typically, in a multi-hop wireless mesh network, an initiating device wishing to transmit data to a destination gateway may initiate a connection through an intermediate device assessed to be the best "next hop" device for routing towards the gateway. The identity of the intermediate device is determined from internal routing tables that may be dynamically (reactively) or proactively updated through the routing exchanges among neighboring devices. In a frequency hopping wireless network the connection establishment may require an initial synchronization phase between the devices. After the initiating device has synchronized with the intermediate next hop device, the two devices will remain frequency synchronized until the communications that necessitated the connection is facilitated. If the intermediate device has direct connectivity to the destination gateway, then it will forward the data from the first device directly to the gateway. If the intermediate device is not a direct neighbor to the gateway, then the intermediate device will forward the data to another intermediate device that is closer in proximity to the gateway, which will then forward the data to another intermediate device, and so on, until the data is ultimately forwarded to the gateway. Throughout the mesh network, devices will initiate these connections with one another so that information can be forwarded to and/or received from a network gateway or other devices. In addition to supporting connectivity to other devices in the network, devices will establish and maintain information on their respective primary connectivity for subsequent communications to the gateway, while also exchanging routing information associated with alternative pathways to the gateway in the event that the first choice becomes unavailable.

In a utility smart grid system where electrical network devices have associated communications capability, the communications connectivity between devices can be independent of the physical connectivity of the electrical grid, which supplies electrical (mains) power to the devices. For instance, while the devices may be connected to the electrical grid along separate feeder lines arranged in various configurations, the physical positioning of each device on the electrical grid need not be taken into account as wireless connections are established for optimal radio connectivity.

In the event of a power outage, some of the pathways through which information is forwarded between devices and their associated gateways may be disrupted as intermediate devices lose power and become unavailable for communications with their network peers. An important element of communications is ensuring that the devices affected by the outage be at least able to communicate the outage events to the HES via a network gateway. In the event of a power outage, since all devices may not be affected, it is desirable that communications can be continued amongst the devices which remain mains-powered in concert with those devices that remain available until their backup power source is exhausted (which can occur on the order of as little as a few minutes). Thus, it is necessary for devices affected by the network disruption to immediately find alternative pathways in order to continue transmitting information to their associated gateways (which themselves, if affected, generally have longer-duration backup power, on the order of many hours), that allows them to continue to operate fully even during extended periods of power outage affecting the underlying electrical distribution network. The difficulty with accomplishing this goal of continued message forwarding is that in an outage, the electrical grid fails to provide power to affected devices that must then rely on short-duration backup power sources (e.g., small capacitors). The typical device backup power supply only provides sufficient energy to support limited communications. Such backup power sources typically have a finite amount of energy, often expiring after a relatively small time period (e.g., a few minutes). The device's operating period on backup battery power is also directly proportional to the number of communications exchanges and data message relay connections that it is required to support and so its operating duration may be variable according to its location within the network and the number of devices for which it may act as an intermediate relay device. With the limited power availability there is insufficient opportunity to support dynamic routing exchanges necessary for establishing or reconfiguring alternative data forwarding paths across the network. Furthermore, over time as data messages continue to be forwarded, more of the devices operating on backup power may become unavailable, particularly devices that under normal operation may have been critical forwarding elements in the multi-hop network. This results in the need to be able to continuously adapt message forwarding paths.

Therefore, following a power outage it is important for initiating and intermediate devices to quickly and autonomously determine new pathways through which they can forward communications to their ultimate destination. As the backup power sources for devices become depleted, it is important to maximize message communications delivery success by adapting the forwarding pathways to the network gateways to make use of all available network device power (including potentially devices with augmented power supplies beyond typical backup duration), as the available network devices and associated connectivity change. This also includes being able to particularly take advantage of devices that are part of the network but that may not themselves be experiencing outage that can provide message forwarding to a serving network gateway.

There is a need for a way to facilitate the transmission of data from devices to gateway devices in an ad hoc multi-hop network during outage conditions when a large number of devices may lose their primary power supply. When such an outage occurs, finding a way to make use of all available power at affected and non-affected devices for message forwarding will help to increase the speed and delivery success of messages sent to the network gateways (particularly for the important outage event notification messages themselves that are necessary to identify and assess the nature of the outage in the underlying electrical network and assist in developing the appropriate restoration action). The ability to quickly route data messages across a mesh network that is temporarily fragmented can also be beneficial during the period of power restoration when some but not all devices have their electrical power restored yet need to be able to immediately communicate their restored status to an HES server.

SUMMARY

These needs and others are met by embodiments of the disclosed concept, which are directed to methods and devices for transmitting communications to other devices in an ad hoc multi-hop mesh network.

As one aspect of the disclosed concept, a method for facilitating a communication to a destination device is provided. The method includes sending, from an initiating device, a first synchronization request to a first device using a unicast transmission protocol, determining that the first synchronization request has failed, sending, using an anycast transmission protocol, a second synchronization request to a plurality of additional devices, the plurality being within radio range of the initiating device, receiving, from a second device of the plurality, a first response message indicating that the second device has accepted the second synchronization request and is capable of being used to facilitate communications with a destination device, and sending, in response to receiving the first response message, a first communication from the initiating device to the second device using a unicast transmission protocol.

As another aspect of the disclosed concept, a further method for facilitating a communication to a destination device is provided. The method includes determining that a first communication has a data size less than a predefined data size threshold, sending the first communication from an initiating device to a first device using a unicast transmission protocol, determining that the first communication failed to be responded to by first device, sending a second communication from the initiating device to a plurality of additional devices within radio range of the initiating device using an anycast transmission protocol, and receiving, from a second device of the plurality, a first response message indicating that the second device has received and accepted the second communication such that the second device will forward the second communication to the destination device.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF PREFERRED EMBODIMENTS

Figure 1A:
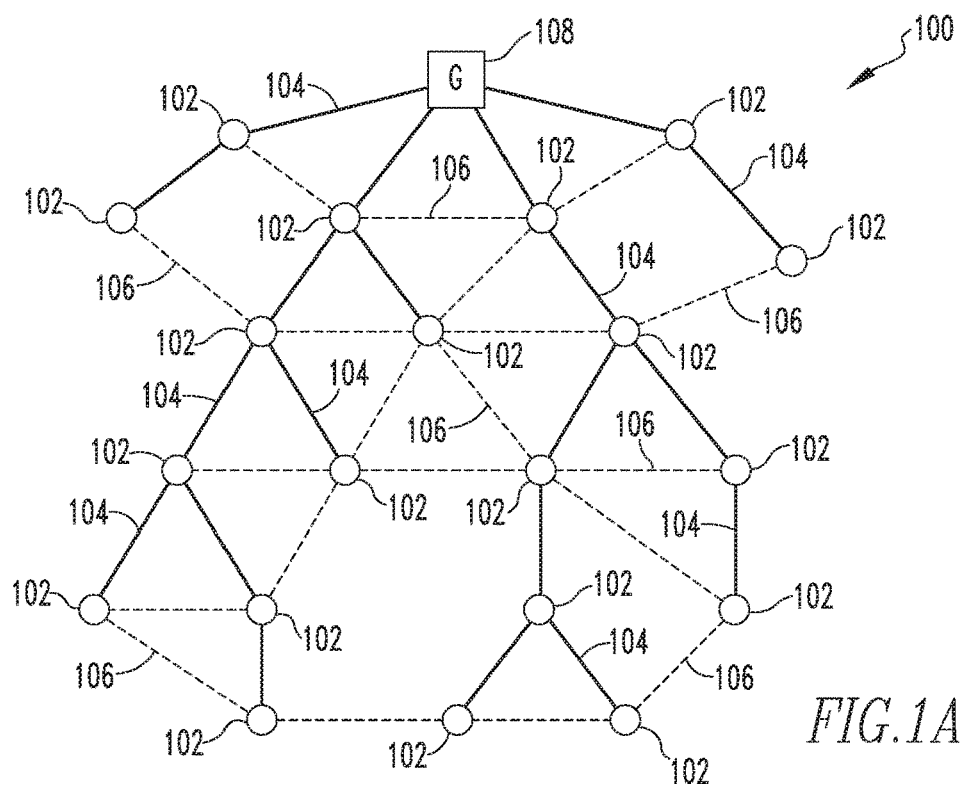
FIG. 1A is an illustrative schematic diagram of a system for facilitating communications within a network, in accordance with an embodiment of the disclosed concept.

Directional phrases used herein, such as, for example, left, right, front, back, top, bottom, and derivatives thereof, related to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the statement that two or more parts are "electrically coupled" or are in "electrical communication" shall mean that two or more parts or components are joined together either directly or joined through one or more intermediate parts such that electricity, current, voltage, and/or energy is operable to flow from one part or component to the other part or component, and vice-versa.

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "dynamic range" shall mean the ratio or difference between the smallest and largest possible values of a changeable quantity (e.g., without limitation, amplitude; magnitude).

As employed herein, the singular form of "a", "an", and "the" include plural references unless the context clearly dictates otherwise.

As employed herein, a "transmitting" device or an "initiating" device refers to any device from which a communication originates, and a "receiving" device or "target" device refers to any device to which a communication is directed.

Additionally, as employed herein, the terms "frequency" and "frequency channel" refer to frequencies within a frequency spectrum that a device may send and/or receive communications on.

FIG. 1A is an illustrative schematic diagram of a system for facilitating communications within a network 100, in accordance with an embodiment of the disclosed concept. In an exemplary, non-limiting embodiment, network portion 100 includes one or more communications devices 102, sometimes referred to as "nodes" or "node devices," and a gateway device 108, sometimes referred to as a "gateway" (which may be one of multiple in the network). Gateway 108 includes, in one embodiment, communications circuitry, such as a radio device, that enables gateway 108 to communicate with one or more of communications devices 102. Gateway device 108 further includes a network interface device that enables gateway device 108 to communicate over a Wide Area Network ("WAN") to a central server device or computing device. Communications devices, in one embodiment, include one or more sensors or actuators, as well as communications circuitry enabling communications devices 102 to communicate with one another as well as gateway device 108.

In one embodiment, gateway device 108 is provided with an identifier stored thereon. For instance, gateway device 108 may include communications circuitry, one or more processors, and memory (e.g., volatile and/or non-volatile memory) with which the identifier may be stored. Generally, each identifier is unique to a particular gateway device, however persons of ordinary skill in the art will recognize that this is merely exemplary. By having an identifier that is unique, however, network 100 is capable of automatically segmenting into various segments.

Each identifier is capable of being assigned to a particular gateway device upon deployment into network 100, however in an embodiment the identifier is assigned during manufacture. Further still, the identifier is capable of being selected by a particular gateway device, such as, for example, by a gateway device selecting a random value (e.g., string of one or more numbers, letters, and/or characters) to be used as the gateway device's identifier upon activation. While it is possible, in this particular scenario, for two or more gateway devices to select, or be assigned, a substantially similar identifier, manual or automated techniques are capable of being used to intervene to change the identifier to be unique, as described in greater detail within commonly assigned U.S. Pat. No. 8,295,295, which issued on Oct. 23, 2012, and the disclosure of which is incorporated herein by reference in its entirety.

In one embodiment, communications devices 102 are configured to periodically exchange network routing information with other communications devices within their vicinity. By exchanging routing information, each of communications devices 102 are able to learn path to other destination communication devices within network 100 that they are not able to directly communicate with. Each of communications devices 102 builds a routing table, stored within the communication device's memory, of the various paths to use to reach each destination within network 100. The routing information, in one embodiment, also includes information related to the quality of the wireless communication links as well as a number of intermediate hops needed to reach a particular destination such that a communications device is able to select an optimal or best (least-cost) path from a variety of different paths to a particular destination. This path cost metric may be defined on the basis of different communications link or device capability-specific criteria.

Solid lines 104, in one embodiment, correspond to optimal or primary paths, at a given point in time, from the network communications devices 102 to reach gateway device 108. In one embodiment, the optimal path for a communications device 102 to reach gateway device 108 includes one or more intermediate, or relay, communications devices, such that a particular communications device 102 accesses (e.g., sometimes referred to as "hops") to a different communications device 102 in order to reach gateway device 108.

Dashed lines 106, in one embodiment, correspond to alternative paths that communications devices 102 may take to reach gateway device 108. These alternative paths typically describe alternate next "hop" paths for a particular communications devices within network 200. If the next hop on the primary path for a communications device 102 is incapable of providing access to gateway device 108, then communications device 102 may attempt to access an adjacent communications device, as seen by dashed lines 106, in order to try and reach gateway device 108, in one embodiment. A more detailed description of multi-hop communications within a frequency hopping ad-hoc mesh network is described in commonly-assigned U.S. Patent Application Publication No. 2016/0165557, corresponding to U.S. patent application Ser. No. 14/867,812, which was filed on Sep. 28, 2015, the disclosure of which is incorporated herein by reference in its entirety.

Communications devices 102, as mentioned previously, exchange information with one another regarding link connectivity and other network information, including but not limited to hop count (e.g., a number of intermediate device links that are needed in order to reach gateway 108), expected transmission count, path bandwidth, throughput, packet loss, load, etc. This information, referred to herein as "metrics," is used by each device 102 to determine which respective neighboring device 102 is capable of establishing primary path links 104 that make up the optimal pathway for the respective device 102 to forward communications to gateway device 108.

Figure 1B:
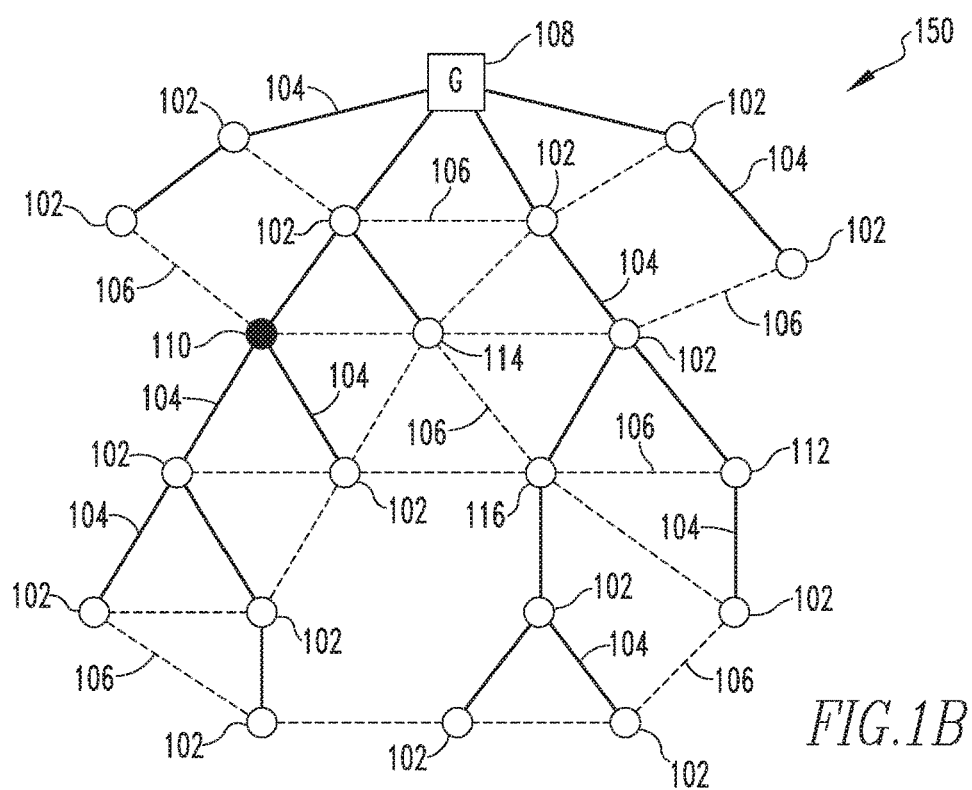
FIG. 1B is an illustrative schematic diagram of a system for facilitating communications within a network during an outage condition, in accordance with an embodiment of the disclosed concept.

FIG. 1B is an illustrative schematic diagram of a system for facilitating communications within a network 150 during an outage condition, in accordance with an embodiment of the disclosed concept. In an exemplary, non-limiting embodiment, network 150 includes communications devices 102 and gateway device 108. Network 150 also includes, in the illustrative embodiment, communications device 110, which may be incapacitated due to any number of possible issues including, but not limited to, fault conditions, power outages, maintenance, and the like. In this particular scenario, communications device 104 is incapable of forwarding communications on its optimal primary routing path, which causes any communications devices relying on communications device 104 is an intermediary communications device for accessing gateway device 108 to now have to utilize alternative pathways for accessing gateway 108. As an illustrative example, an alternative pathway for a communications device 112 to access communications to gateway 108 may include using neighboring communications devices 114 or 116. Because communications device 110 is also a "first choice" communications device—as determined by prior routing exchanges and stored in a routing table for communications device 112—an alternate pathway for accessing gateway device 108 is needed. Accordingly, based on various metrics ascertained from routing exchanges, communications device 110, in one embodiment, utilizes its second choice for accessing gateway device 108 to re-establish a primary routing path to gateway 108. For example, the second choice may correspond to communications device 114. As such, communications device 110 accesses communications device 114 via alternative link, as seen by dashed lines 106. In this way, primary connectivity paths are established between network devices with the mesh network providing diverse alternatives for connectivity among communications devices and between devices and a gateway.

Figure 2A:
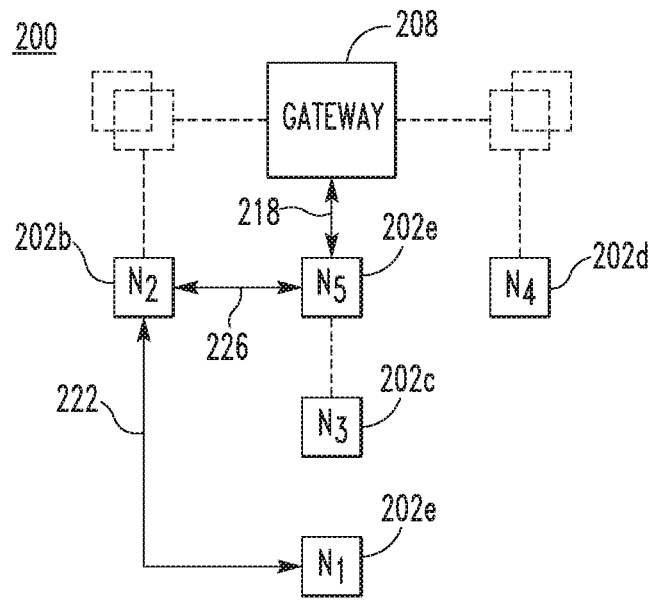
FIG. 2A is an illustrative schematic diagram of a portion of an ad-hoc multi-hop wireless network operating, in accordance with an embodiment of the disclosed concept

FIG. 2A is an illustrative schematic diagram of a portion 200 of an ad-hoc multi-hop wireless network operating, in accordance with an embodiment of the disclosed concept. In a non-limiting embodiment, network 200 includes communications devices 202a-e and gateway device 208, which may be substantially similar to communications devices 102 and gateway device 108 of FIGS. 1A and 1B, and the previous description may apply. In on embodiment, communications device 202a is an initiating device, whereas communications devices 202b-e serve as intermediary devices for facilitating communications from communications device 202a and/or one or more additional communications devices.

In one embodiment, communications device 202a may send a first communication to gateway device 208 via unicast transmission protocols. For instance, in this particular scenario, communications device 202a may send a first communications to communications device 202b using a unicast transmission message, as illustrated by arrow 222. Upon receipt, communications device 202b may then send the first communications to communications device 202e using another unicast transmission message, as illustrated by arrow 226, and communications device 202e may then send the first communications to gateway device 208 using another unicast transmission, as illustrated by arrow 218. Persons of ordinary skill in the art will recognize that although unicast transmission are used to facilitate communications between communications devices 202a, 202b, and 202e, and gateway device 208, this is merely exemplary, and any suitable network addressing and routing methodology may be employed. Furthermore, although only five devices are illustrated within FIG. 2A for simplicity, persons of ordinary skill in the art will recognize that network 200 is capable of including any number of communications devices (e.g., 5, 10, 1,000, etc.).

In the illustrative embodiment, communications device 202c and 202d are not necessary for the facilitating communications from communications device 202a to gateway device 208, as communications device 202b serves as a primary next-hop choice for communications device 202a. As such, in response to determining that a first communication is to be sent to gateway device 208, communications device 202a sends a synchronization request to communications device 202b using a unicast transmission. Communications device 202b, which in one embodiment is also operating normally with standard (non-backup) power availability, sends a response message back to communications device 202a using unicast transmission, where the response message indicates acceptance of the synchronization request. Upon synchronization, communications devices 202a is capable of communicating the first communication to communications device 202b, at which point communications device 202b is structured to attempt to synchronize with its next hop, in order to provide the first communication to gateway device 208. The process of synchronizing between devices in an ad-hoc mesh network is described in more detail within commonly-assigned U.S. Patent Application Publication No. 2016/0165557, corresponding to U.S. patent application Ser. No. 14/867,812, which was filed on Sep. 28, 2016, the disclosure of which is incorporated herein by reference in its entirety.

Figure 2B:
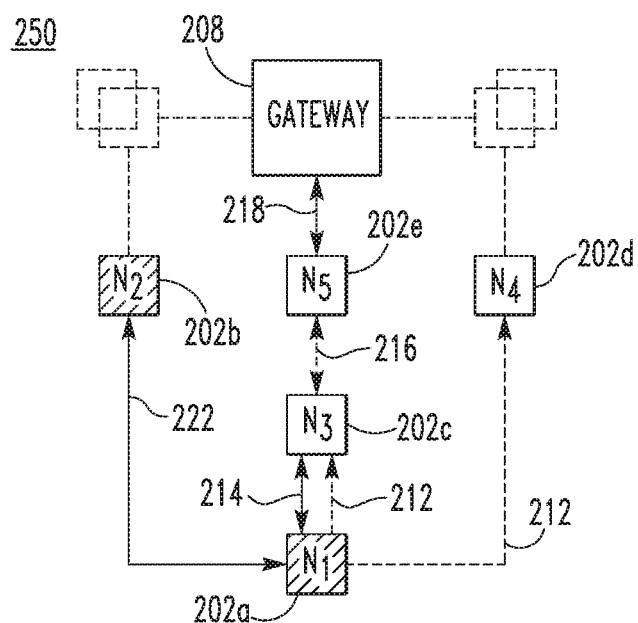
FIG. 2B is an illustrative schematic diagram of a portion of an ad-hoc multi-hop wireless network in an outage condition, in accordance with an embodiment of the disclosed concept.

FIG. 2B is an illustrative schematic diagram of a portion 250 of an ad-hoc multi-hop wireless network in an outage condition, in accordance with an embodiment of the disclosed concept. In an exemplary, non-limiting embodiment, portion 250 includes communications devices 202a-e and gateway device 208. Also included in FIG. 2B are arrows 214, 216, and 218. Arrows 212 represent transmissions of communications via anycast transmission protocols. Arrows 214, 216, and 218 represent transmissions of communications via unicast transmission protocols. In aspects of the disclosed concept, a unicast transmission protocol is a communication sent by a device that is specifically addressed and directed to single other device. In aspects of the disclosed concept, an anycast transmission protocol is a communication that is addressed using a special address identifier that provides information on the intended destination but that allows multiple recipients of the communications to qualify as destination candidates. Destination candidates are devices that satisfy a given set of criteria associated with identified parameters, including but not limited to parameters related to the metrics ascertained during routing exchanges.

Although only five devices are illustrated in FIG. 2B for simplicity, it is understood that network 250 can include any number of devices, including, but not limited to, hundreds, thousands, and even millions of devices. In the example associated with FIG. 2B, communications device 202a seeks to send communications messages to gateway 208. Under normal operating conditions, as described above with reference to FIG. 2A, communications device 202a will send a first synchronization request to a first next hop (e.g., a communications device stored within its routing table as being an optimal path to access gateway device 208) at one or more frequencies, in accordance with the system synchronization protocol (using frequencies known to persons of ordinary skill in the art as "pseudorandom" frequencies). The particular intermediate device selected will be based on information maintained by communications device 202a within its routing table (as determined from prior routing exchanges amongst devices in network 250). The first intermediate device (e.g., communications device 202b) will then transmit a message to communications device 202a acknowledging and accepting the synchronization request on at least one other pseudorandom frequency. However, in the embodiment of FIG. 2B, communications device 202 fails to receive a message accepting the synchronization request or never receives a message or other indication that the first communication has been received by the targeted intermediary device. Communications device, in one embodiment, is structured to repeat this process by sending another synchronization request to the first intermediate device at one or more different frequencies. If communications device 202a again fails to receives a message acknowledging the synchronization request or otherwise receives notification that the request to synchronize has failed, then communications device 202a may send a synchronization request to other devices determined using prior routing exchanges to be the best alternative intermediate devices for accessing gateway 208. Where a device maintains these alternatives as part of its routing table information, attempts can be made to use alternative paths for the intended communications to the destination gateway (or other destination device in the more general communications case). All of these transmissions, however, require the expenditure of energy. During an outage where one or more devices of a network may become unavailable due to a loss of power supply, communications device 202a does not know beforehand which devices in the network are affected by the outage and/or are available for forwarding the communication to gateway 208. Further, initiating communications device 202a typically lacks the backup battery power necessary to attempt synchronization with a large number of devices or attempt to dynamically establish through neighbor communications the existing connectivity within the network. Instead, what is needed, particularly given the dynamic environment where additional devices may continue to exhaust their backup power resources, is a means by which the desired communications can be allowed to proceed through a forwarding mechanism that can be constructed quickly and that can allow an autonomous, energy efficient method of utilizing any alternative existing pathways to forward communications to a target destination.

Accordingly, in a non-limiting embodiment, communications device 202a is in outage and needs to transmit a communication containing information related to the outage to gateway device 208. As such, initiating communications device 202a attempts to synchronize with its first intermediate device (as determined using prior routing exchanges) communications device 202b in order to forward a communication to gateway device 208. This attempt begins when communications device 202a sends a synchronization request via unicast transmission 212 to communications device 202b. For any number of reasons, communications device 202b is not able to synchronize with communications device 202a. For example, in a non-limiting embodiment, communications device 202b is also affected by the outage and as a result has no power. In another non-limiting embodiment, the connectivity of communications device 202b is disrupted and communications device 202a is incapable of establishing a connection with communications device 202a. As an illustrative example where communications devices 202a and 202b are in outage, in order to forward the communication to gateway device 208, based on the nature and high priority of the intended communications, communications device 202a will need to find an alternative route to access gateway device 208.

To do this, communications device 202a sends out a synchronization request to any potential neighboring devices using an anycast transmission communication. For instance, an anycast transmission communication may be broadcast to communications devices 202c and 202d, which may be in radio range of communications device 202a such that communications devices 202c and 202d are able to receive the anycast transmission. Anycast transmissions, in the illustrative embodiment, do not specify a particular intermediate device but rather provide an address that is associated with gateway device 208 together with additional routing-related priority information that allows any receiving device to be able to determine its suitability for delivering the communications to the destination.

Communications device 202c, in the exemplary embodiment, is capable of forwarding the communication from initiating communications device 202a to gateway device 208. Therefore, communications device 202c sends, in response to the anycast transmission represented by arrow 212, a response message indicating an acceptance of the synchronization request to initiating communications device 202a via transmission 214. After initiating communications device 202a synchronizes with communications device 202c, initiating communications device 202a sends the communication to communications device 202c via a unicast transmission, as illustrated by arrow 214. After communications device 202c receives the communication, it then sends the communication to its next hop, which in the illustrative embodiment corresponds to communications device 202e, via transmission 216, which in turn sends the communication to gateway device 208 via transmission 218.

In a non-limiting embodiment, each device in the network communicates with one another at various frequencies. For instance, after communications device 202a determines that its initial attempt to synchronize with communications device 202b has failed, it will broadcast a synchronization request via anycast transmissions to any available neighboring devices, in this case communications devices 202c and 202d, at a first frequency. In various non-limiting embodiments of the disclosed concept, the synchronization request is sent via anycast transmissions at multiple frequencies. After sending the synchronization requests, communications device 202a will hop to a second frequency and await a response from any other device within radio proximity that received the anycast-transmitted synchronization request.

In a non-limiting embodiment, communications devices 202c, 202d, and 202e correspond to intermediate devices that act as routing devices for facilitating communications to a particular destination (e.g., a gateway device or other network access device). The destination may be, for example, an endpoint device on the local network, or gateway device 208, which may provide a connection between the local network and another network or server. In an embodiment of the disclosed concept, communications devices 202c and 202d are both capable and available for forwarding the communication from initiating communications device 202a to gateway device 208. As such, it is necessary that devices be able to autonomously establish their prioritization among potential receiving devices while unaware of the current status or availability of their device neighbors.

In order to determine which device should receive higher priority for responding to the received synchronization request communication from communications device 202a, communications devices 202c and 202d determine, based on information provided in conjunction with the anycast request, the respective device's power source, available power, and various network details relative to initiating communications device 202a (based on routing metrics ascertained during the routing exchanges previously completed in the network), a path priority metric associated with relaying the communication to be sent by communications device 202a. The path priority metric may be determined in various ways and may be derived from multiple elements beyond the dimensions of routing path cost and device power supply/availability. The path priority, while not limited to, may be represented by a numerical scalar value.

In the illustration of FIG. 2B, during an outage, communications device 202a might be affected, while communications device 202c is unaffected and still receiving power from the electrical grid, a photovoltaic cell, or another essentially unlimited power source unrelated to the electrical grid. As a result, in the dimensions of power availability, communications device 202c will have a high priority because it has a consistent power source and is not relying on any backup power at the time, and thus the path priority would be correspondingly high as communications device 202c would not be expending much of its essentially limitless power. In the dimension of network routing, communications device 202c may have the same or lower path cost by virtue of its relative network path location between the initiating communications device 202a and the intended destination gateway. The net result is an overall path priority that is higher than surrounding device neighbors.

When initiating communications device 202a transmits a synchronization request, the synchronization request will contain indicators to any potential intermediate devices of the specified temporal intervals accessible to potential intermediate devices based on their respective path costs. For example, when using hop count as the routing metric, if communications device 202c has a path cost with a hop count of two (2) hops (e.g., two intermediate communications devices) to the destination gateway device 208 and is not currently affected by power outage, then it would have a relatively low path cost, and an overall correspondingly high path priority response value. Continuing this example, if communications device 202d has hop count of three (3) hops to the destination gateway device 208, and is in outage and operating with a partially depleted backup power source, then communications device 202d will have a relatively low path priority for relaying communications from device 202a. The synchronization request sent by initiating communications device 202a contains indictors of the initiating device's network location path cost to the intended (gateway) destination, as well as the number of temporal intervals assigned for responding devices. As such, communications device 202c would respond in an earlier temporal interval, based on its calculated path priority, while communications device 202d will be on standby to transmit a response message to initiating communications device 202a at a later temporal interval if it does not detect that a response from device communications device 202c or any other device in network 250 having a lower path cost, higher priority value, etc. was sent to initiating communications device 202a accepting the synchronization request.

In a non-limiting embodiment, the number of temporal intervals for sending a response message is dynamically determined by the device initiating the anycast request and may be based on prior or current understandings of the network neighborhood environment (i.e., as stated above, determined through prior routing exchanges or current assessment of the local radio environment). Based on the defined system operation, devices with path priority values within a first threshold must respond within the first defined temporal interval specified after the synchronization request is sent, and that devices associated with path priority values within a second threshold must respond within the second defined response timeslot, etc. In an embodiment, as part of the defined system frequency hopping operation, after sending the synchronization request, initiating communications device 202a switches to a second frequency and awaits the earliest response to the synchronization request. As part of the defined system frequency hopping operation, after receiving the synchronization request on their respective frequencies, communications devices 202c and 202d may switch to a second frequency to transmit their response message. At the second frequency, communications devices 202c and 202d wait to respond to the synchronization request at the temporal interval dictated by their respective path priority values. During this time, communications device 202c and 202d are listening to determine whether any other devices have responded to the synchronization requests. In one embodiment, the intermediate device having the highest path priority, which in this example is communications device 202c, will respond at the earliest temporal interval, which in this example may be within the first specified timeslot. Accordingly, communications device 202d, which is also listening in at the second frequency, determines that it no longer needs to respond to the synchronization request upon detecting the response message sent by communications device 202c. As a result, even if intermediate communications device 202d is capable of facilitating the target communication to gateway device 208, it may instead return to an idle mode on another frequency, forward communications with other devices, or perform any of its other functions due to the fact that it is no longer needed to facilitate the target communication sent by initiating communications device 202a.

In a non-limiting embodiment, the response from a potential intermediate device is a message indicating an acceptance of the synchronization request from the initiating device. For example, when communications device 202a sends a synchronization request at the first frequency through anycast transmission 212 and hops to the second frequency, communications device 202c can send a response message accepting the synchronization request at the second frequency. The response message sent by communications device 202c is sent via unicast transmission 214 addressed to the initiating communications device 202a.

In another embodiment, individual data transmissions between various devices within network 250 may be sent at multiple frequencies. For instance, synchronization requests between initiating devices and intermediate devices may be sent at multiple frequencies. Likewise, anycast transmissions and the sending of communications may be sent at multiple frequencies. In a non-limiting embodiment, after synchronizing with intermediate communications device 202c, initiating communications device 202a may separate the communication into multiple data frames or packets and send the communication to intermediate communications device 202c on multiple frequencies, which may then in turn separate the communication into multiple data frames or packets and send the communication to intermediate communications device 202e on multiple frequencies, and similarly in the communications from device 202e to gateway device 208.

Figure 3:
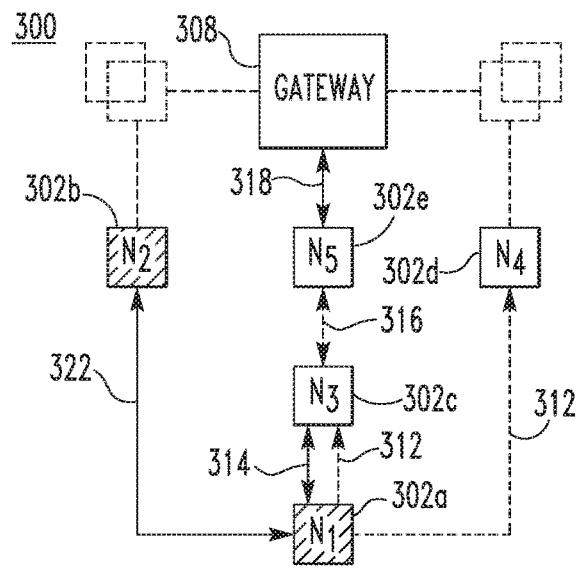
FIG. 3 is schematic illustration of another ad-hoc multi-hop wireless network operating during an outage condition, where a communication being sent is of a particular data size, in accordance with an embodiment of the disclosed concept.

FIG. 3 is a schematic illustration of another ad-hoc multi-hop wireless network 300 operating during an outage condition, where a communication being sent is of a particular data size, in accordance with an embodiment of the disclosed concept. In a non-limiting embodiment, network 300 includes an initiating communications device 302a, intermediate communications devices 302b-e, and gateway device 308. Communications sent via unicast transmission protocols are illustrated by arrows 322, 314, 316, and 318, and communications sent via anycast transmission protocols are illustrated by arrows 312. In an exemplary, non-limiting embodiment, initiating communications device 302a attempts to forward a communication to gateway device 308. In a non-limiting embodiment, a communication is of a particular data size and/or of a particular priority level (e.g., high priority). For example, a high priority communications, such as a power outage alarm notification resulting in the loss of the primary power source at initiating communications device 302a, should be provided to gateway device 308 as expediently as possible.

In one embodiment, communications device 302a determines that the communication is a high priority communications, and also determines that the data size of the communication is below a predefined threshold. For instance, the communications may be tens of bytes. If the data size is sufficiently small (as specified within the device as a function of the operating communications network), communications device 302a determines that rather than send a synchronization request to its primary intermediate communications device 302b, it can expedite the process by directly sending the communication to communications device 302b without first performing synchronization and awaiting a response. After sending the communication to communications device 302b via a unicast transmission, initiating communications device 302a awaits a response or other indication that informs communications device 302a that the communication was received by communications device 302b. If a response from communications device 302b is not received within a predefined amount of time, communications device 302a determines that communications device 302b has failed to receive the communication and is thus unavailable to forward the communication to the intended destination (i.e. gateway device 308). Therefore, initiating communications device 302a must find an alternative route for accessing gateway device 308.

In one embodiment, initiating communications device 302a accomplishes this by attempting to access gateway device 308 using any other available network devices. This is accomplished, in the illustrative embodiment, by sending the communication using an anycast transmission to any neighboring communications device capable of forwarding the communication to the intended destination. Communications device 302a may do this by sending the communication out via anycast transmission. In the illustrative embodiment, communications devices 302b-d are within "radio range" of communications device 302a, and therefore are capable of receiving the communications. Any communications devices receiving the anycast-transmitted communications will determine whether they are capable of forwarding the communication to gateway device 308. In one exemplary embodiment, communications device 302c, by virtue of various factors (e.g., power availability and location within the network relative to communications device 302a), is able to facilitate the communication to gateway device 308. In one embodiment, based on its calculated path priority, communications device 302c is the first communications device to respond acknowledging receipt of the anycast-transmitted communications, and therefore communications device 302c will further facilitate the communication being sent to gateway device 308.

In one embodiment, communications device 302c accepts the anycast communication, and sends an acknowledgment response message to communications device 302a via transmission 314 indicating that it has received the communication and is sending the communication to gateway device 308. In one embodiment, communications device 302c is structured to then send the communications to its own intermediate communications device 302e via unicast transmission 316, which in turn forwards the communication to gateway device 308 via transmission 318, however persons of ordinary skill in the art will recognize that this is merely illustrative.

In a non-limiting embodiment, the response indicating acceptance of the anycast communication is sent to communications device 302a from communications device 302c using the unicast transmission protocol, as seen by arrow 314. In one embodiment, communications device 302c is further structured to inform the other communications devices within network 300 that it has received the communication, and is facilitating the communication being sent to gateway device 308. This may be achieved in the manner described in the illustrative example of FIG. 2B through the use of an indicated frequency and set of temporally-defined acknowledgment response timeslots that can be simultaneously monitored by all communications devices that received the anycast message transmission. The reason for this is that in the event that communications device 302d is also capable of facilitating the sending of the communication to gateway device 308, but has, for instance, a higher path cost for sending the communication to gateway device 308 (due to, for example, a largely depleted backup power supply), transmission 314 from communications device 302c will signal to communications device 302d and any other potential intermediate devices that another device in the network has confirmed its receipt and acceptance of the message forwarding request. As a result of the confirmed communications acceptance from communications device 302c, communications device 302d will simply delete the communication from its memory and return to an operating mode where it can facilitate communications from other devices in the network. In a non-limiting embodiment, intermediate communications device 302d has such a high path cost (and correspondingly low associated path priority) that it determines, based on various metrics, that the costs of facilitating the communication from initiating communications device 302a is too high. In that case communications device 302d, upon receipt of the communication, will refrain from taking any further action (such as tuning to the predetermined response message frequency), and will simply delete the communication from its memory and return to an operating mode where it can facilitate communications from other devices in the network.

In a non-limiting embodiment, it is possible that more than one intermediate device may receive the communication from communications device 302a and will forward the communication toward gateway device 308. For instance, two potential intermediate devices have different response path priorities but are physically located such that the lower priority intermediate device (e.g., the device having a higher path cost and/or lower remaining power availability) is unable to receive the acknowledgment response message transmitted by the higher priority device and thus still sends its own acknowledgment response message and independently forwards the communication toward gateway device 308. In this embodiment, each potential intermediate device will accept the communication from communications device 302a independent of one another, and will forward that communication to gateway device 308, resulting in a duplicate communication being sent to gateway device 308. In another non-limiting embodiment, communications device 302a will not transmit any path threshold indicator for acceptance of the communication (e.g., there may be no instructions with respect to path cost thresholds or temporal intervals), or requirements for sending acknowledgment and will merely transmit the communication via anycast transmission 314 continuously at various frequencies. The drawback to this flooding approach is that while it may provide increased diversity and redundant paths for the transmission of the communication to the gateway device 308 from initiating communications device 302a, it can also consume significant network communications resources (e.g., by depleting power from other devices forwarding the redundant communications throughout the network).

Figure 4:
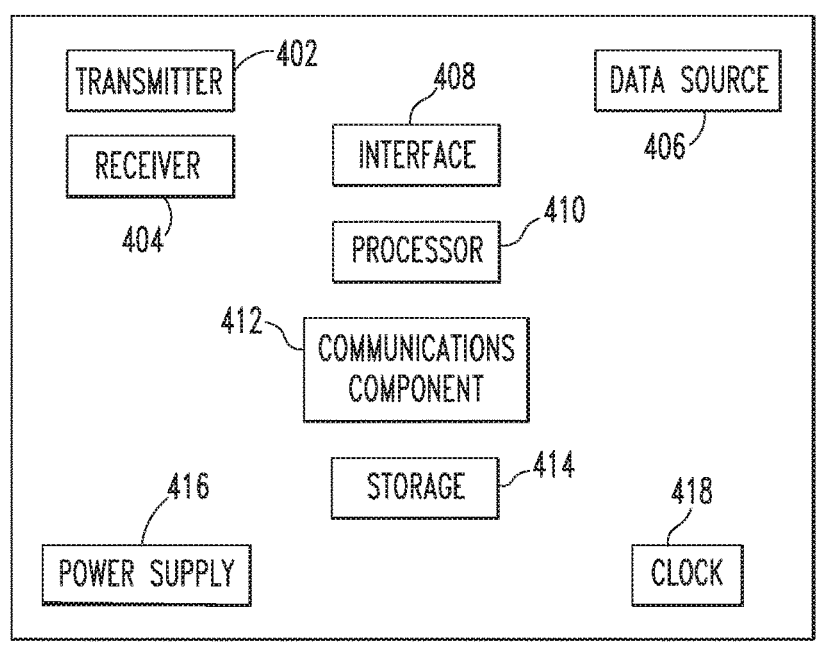
FIG. 4 is an illustrative block diagram of an exemplary communications device, such as the communications devices of FIGS. 1A, 1B, 2A, 2B, and 3, in accordance with an embodiment of the disclosed concept.

FIG. 4 is an illustrative block diagram of an exemplary communications device 400, such as the communications devices of FIGS. 1A, 1B, 2A, 2B, and 3, in accordance with an embodiment of the disclosed concept. Persons of ordinary skill in the art will recognize that communications device 400 is merely one example of a communications device that may be implemented within an ad-hoc multi-hop wireless network, and it is not limited to being only one part of the network. In a non-limiting embodiment, communications device 400 includes a transmitter 402 and a receiver 404, a data source 406, an interface 408, a processor 410, a communications component 412, a storage component 414, a power supply 416, and at least one clock 418.

One or more of the previously mentioned components may be omitted or combined, and/or one or more additional components may be added. For example, communications device 400 may include a bus connector. As another example, communications device 400 may include multiple instances of one or more of the components included therein, however for simplicity, only one of each component has been shown. For example, multiple storage components may be included within communications device 400, and each storage may have a different or similar function.

In a non-limiting embodiment, transmitter 402 and receiver 404 can operate alternatively or simultaneously. Data source 406, in one embodiment, is served by transmitter 402 and receiver 404 and provides a variety of functions for the device. For example, data source 406 may be an application processor that interfaces with a utility meter or sensor, or data source 406 may be a utility meter or sensor itself. As another example, data source 406 may be an instrument, actuator, and/or a computer system, however these are merely illustrative examples.

Interface 408, in one embodiment, facilitates inputs and outputs of applications and controls data between transmitter 402 and receiver 404 and data source 406. Interface 408 may include digital to analog (D/A) and/or analog to digital (A/D) circuitry. Interface 408 may also include bus circuitry, one or more serial ports (e.g., a USB port), a parallel portion, or any other port or circuitry, or any combination thereof.

Processor(s) 410 includes any processing circuitry, such as one or more processors capable of controlling operations and functionality of the device. In one embodiment, processor(s) 410 facilitates communications between various components within the device. For example, processor 410 may oversee and coordinate functionality of transmitter 402 and receiver 404 and/or control the operation of data source 406. Processor 410, in one exemplary embodiment, runs an operating system of the device, applications resident on the device, firmware applications, media applications, software resident on the device, or any other type of application, or any combination thereof. In one embodiment, processor(s) 410 detects inputs and/or relates detected inputs to one or more actions to be performed on or by the device. For example, processor 410, in one embodiment, communicates with interface 408 such that inputs to interface 408 are recognized and processed accordingly.

In a non-limiting embodiment, processor(s) 410 is capable of determining a facilitation cost associated with sending a given communication to another device. In one embodiment, processor(s) 410 coordinates with storage 414, power supply 416, and communications component 412 in order to ascertain its remaining battery power, the distance of the device from another device using, for instance, a global positioning system, and the amount of power necessary to facilitate the communication to another device. Processor 410 may be further structured to coordinate with clock 418, transmitter 402, and receiver 404 in order to send messages to other devices in the network at specific time intervals.

Communications component 412 includes any circuitry capable of connecting to a communications network, such as a gateway, and/or transmitting communications (e.g., data) to one or more devices and/or servers. Communications component 412 communicates using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quad-band, VOIP, or any other protocol, or any combination thereof.

Storage 414 includes one or more storage mediums. Various types of storage mediums include, but are not limited to, hard-drives, solid state drives, flash memory, permanent memory (e.g., ROM), or any other storage type, or any combination thereof. Any form of data, such as photographs, music, files, videos, applications, and/or documents, is capable of being stored within storage 414. Storage 414, in one embodiment, also corresponds to memory. For example, storage 414 may include cache memory, semi-permanent memory (e.g., RAM), or any other type of memory. In one embodiment, a separate memory component, or separate memory components, are included within the device. In one non-limiting embodiment, storage 414 stores routing information, such as a routing table, for communications device 400. The routing table stored by storage 414 includes various other communications devices within a network that communications device 400 is part of. Additionally, the routing table includes, amongst other features, path costs, address, identifiers (e.g., color identifiers), primary gateway devices, and/or auxiliary gateway devices associated with communications device 400 and/or one or more additional communications devices within a local network.

Power supply 416 provides electrical power for some or all of the components of the device. Each component, however, may have a different power requirement and power supply 416 is capable of providing an appropriate power supply to each component. Power supply 416 includes, but is not limited to, a battery, power capture circuitry (e.g., a photovoltaic cell), and/or an electrical generator circuit.

Clock 418, in one embodiment, includes any form of digital and/or analog clock. Clock 418 is capable of synchronizing with an overall master clock, such as a clock corresponding to a server, however, clock 418 may be programmed individually. In one embodiment, clock 418 includes one or more timers or counters that measure a temporal difference between clock 418 of the device depicted in FIG. 4 and another clock located on a separate device. Clock 418 is capable of being precise to the minute, second, millisecond, or nano-second, or any other temporal unit such that differences between clock 418 of the device depicted in FIG. 4 and another clock on a separate device is capable of being determined.

Figure 5:
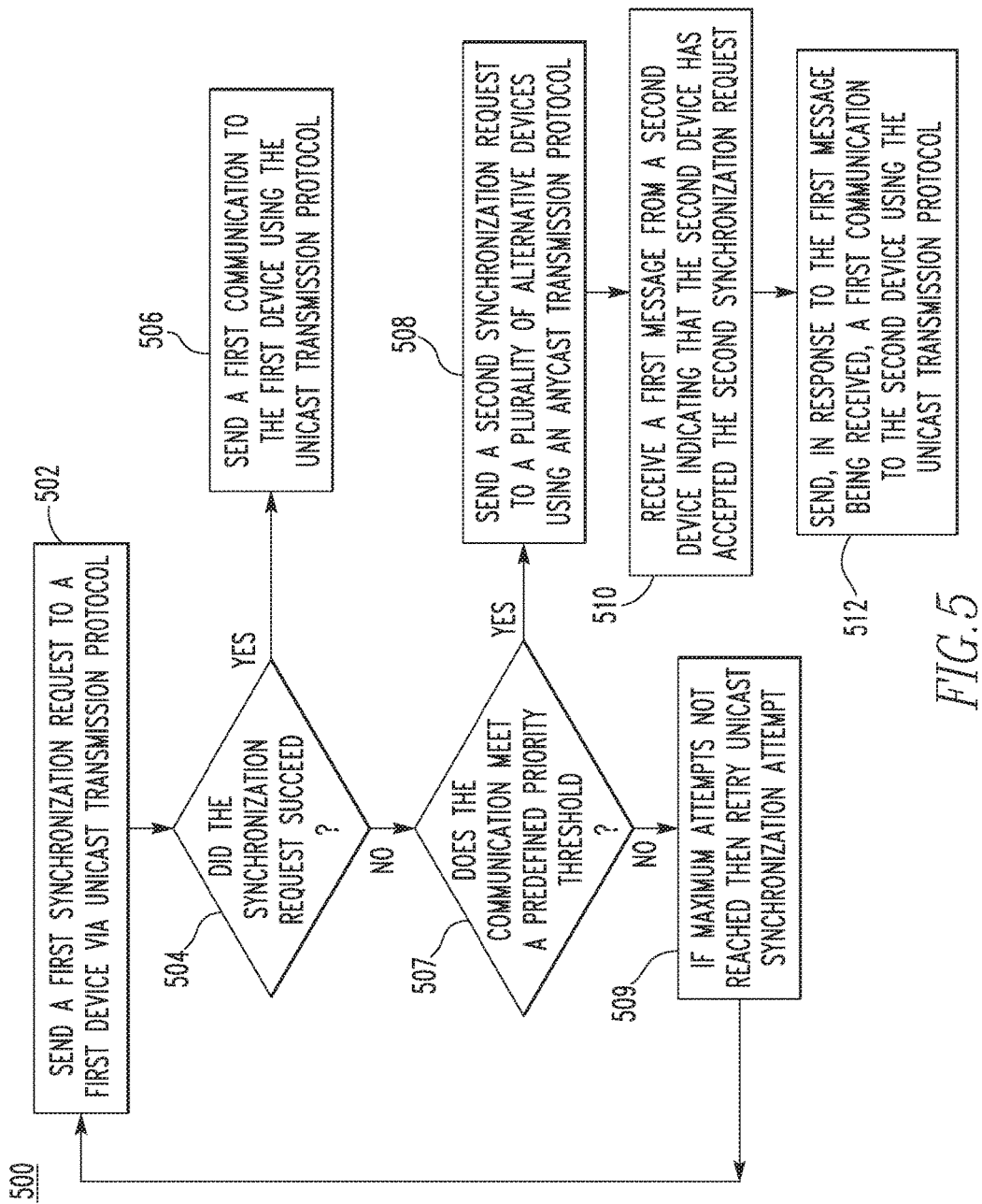
FIG. 5 is an illustrative flowchart of a process for facilitating communications in an ad-hoc multi-hop wireless network during an outage condition, in accordance with an embodiment of the disclosed concept.

FIG. 5 is an illustrative flowchart of a process 500 for facilitating communications in an ad-hoc multi-hop wireless network during an outage condition, in accordance with an embodiment of the disclosed concept. Process 500, in the non-limiting exemplary embodiment, begins at step 502. At step 502, an initiating device sends a first synchronization request to its first choice, next-hop intermediate communications device in order to send a communication to a gateway. The first communications device, for example, may store routing information within its memory that indicates a particular communications device within its local network that has an optimal route to access a gateway device. At step 504, a determination is made as to whether or not the synchronization request was successful. For example, the initiating communications device may determine whether a synchronization acceptance response was received within a defined time period. If, at step 504, the initiating communications device determines that the synchronization was successful, then process 500 proceeds to step 506. At step 506, the initiating communications device and the targeted communications device are able to successfully synchronize with each another such that the initiating communications device is able to send an intended communication to targeted communications device in order to relay that communication to the gateway device.

If, at step 504, the initiating communications device determines that the synchronization request was not successful, then process 500 proceeds to step 507. At step 507, a determination is made as to the nature and priority of the particular communication that the initiating communications device intends to have routed to the gateway device. The communication priority may be determined by various factors, including but not limited to, an operating status of the initiating communication device, and/or a nature of the communication to be sent to the gateway device. For example, certain network application services may require that a high priority communication be sent the gateway device for confirmation of an important received system command. As another example, a high priority communication may need to be sent as a result of an alarm event at the particular network device. If, at step 507, the communication is determined to not be of sufficiently high priority (e.g., the communication does not meet a predefined priority threshold), then process 500 proceeds to step 509, where the initiating device will simply retry synchronizing to its first choice intermediate communications device until a defined number of attempts is reached.

If, however, at step 507, it is determined that the communication is of sufficiently high priority, then process 500 proceeds to step 508. At step 508, the initiating device sends a synchronization request via an anycast transmission to a plurality of potential alternative intermediate devices in the network. For example, an anycast transmission may be capable of being received by any communications device within radio range of the initiating communications device. At step 510, the initiating communications device receives an acknowledgment message from a second device within the network, which received the anycast transmission, where the acknowledgement message indicates that the second device is capable of forwarding the communication to the gateway device. The message, for instance, will indicate that the synchronization request has been accepted, and confirming a particular frequency such that the initiating device and the second device will be able to maintain subsequent synchronization with one another. At step 512, the initiating device will then send, in response to receiving the response message accepting the synchronization request, the communication to the second device using a unicast transmission.

In a non-limiting embodiment, at steps 502, 504, and 506, an initiating device is following the protocol to transfer data under normal operating circumstances. In a non-limiting embodiment, in the event of an operating status change at the device such as a power outage, step 502 and step 504 are performed in order for a device to determine whether its first choice intermediate device (determined through prior routing exchanges) has been similarly affected by outage to the extent that the first choice intermediate device is unavailable for forwarding communications to a destination, such as a gateway device. If the first choice intermediate device is unavailable, then it will support forwarding of the communications to the gateway. After the initiating device sends its first choice intermediate device a synchronization request via the unicast transmission protocol, it awaits a response for a given period of time on a designated frequency. The anticipated response is a message from the first intermediate device indicating acceptance of the synchronization request. If the initiating device does not receive an acknowledgment message, then at step 504 it will determine that the synchronization request has failed. At step 507, the priority of the communication will dictate that an alternative transmission path should be more immediately found using the anycast transmission protocol. In a non-limiting embodiment, at step 509, the initiating device might perform a predetermined number of attempts to repeat steps 502 and 504 based on the priority level of the communication (thus, delaying or avoiding use of alternative intermediate devices for low priority communications, so that other devices can send higher priority communications through those alternative intermediate devices).

In a non-limiting embodiment, at step 508, after the initiating device has determined that the synchronization request sent to its first intermediate device has failed at step 504, it determines that it must seek out and find alternative pathways for sending communications to the gateway at step 507. This is accomplished by sending repeated synchronization requests to other potential candidate devices that may be available in the network, including a second device. The repeated synchronization requests are made via the anycast transmission protocol. In a non-limiting embodiment, as stated above, other devices in the network will determine, based on various metrics, a path priority associated with forwarding the communication from the initiating device to the gateway. In a non-limiting embodiment, each device, based on their respective path priorities, will be structured to respond to the synchronization request at one of a set of predefined temporal intervals that are a function of a path priority threshold (e.g. a range of path priorities will be assigned to a temporal interval during which a device must respond). For instance, devices with the highest path priority will respond during the earliest temporal intervals. In another non-limiting embodiment, the path cost threshold may be such that only one device in the network may be capable of having a path priority at that threshold, and thus would be the only device capable of sending a response to the initiating device in a given temporal interval. At step 508, the initiating device, based on knowledge of its operating network environment during normal conditions and derived through neighbor routing and other network communications exchanges, will determine the necessary number of temporal interval slots, indicated with the anycast transmission, for transmitting response messages to the initiating device. This determination of the number of temporal interval slots can be based on achieving an appropriate system tradeoff with regard to minimizing potential collisions among responding (priority-determined) alternative devices while also limiting the wait period to receipt of a response message and before anycast transmission attempts must be repeated.

In a non-limiting embodiment, at step 510, when a communications device, such as the second device, sends a response message to the initiating communications device, the response message will be sent indicating its acceptance to the synchronization request, which when observed, also signals to other devices in the network that they need not respond to the synchronization request. Once the initiating device receives this message from the second device, it synchronizes with the second device and sends the communication to the second device, so that the second device can then facilitate the communication to the gateway. In a non-limiting embodiment, the initiating device may then update its routing table such that the second device becomes the initiating device's first choice device for forwarding communications from the initiating device to the gateway In a non-limiting embodiment, process 500 is performed using frequency hopping techniques. A more detailed description of some exemplary hopping techniques is described in greater detail within commonly assigned U.S. patent application Ser. No. 14/867,812, which was filed on Sep. 28, 2015, and the disclosure of which is hereby incorporated herein by reference in its entirety. In step 502 the unicast synchronization request may be sent across multiple frequencies. Similarly, at step 508, after determining that the synchronization request to the first choice intermediate device has failed at step 504 and that the communication is of sufficiently high priority at step 507, the initiating device will send a synchronization request to other candidate devices in the network, including the second device using transmissions across multiple frequencies. At steps 502 and 508, after unicast and anycast transmissions respectively, across multiple frequencies, the initiating device will then hop to another second frequency and await a response. In a non-limiting embodiment, devices that have a path priority that fails to meet a certain threshold indicated from the anycast transmission (for example, as a result of their location in the network relative to that of the initiating device) will not accept the synchronization request. Accordingly, these devices will not hop to the second frequency to send a message to the initiating device indicating acceptance of the synchronization request. Devices that have a path priority meeting the threshold will be capable of accepting the synchronization request. As such, they will hop to the second frequency. However, depending on where the respective device's path priority exists within the temporal intervals slots indicated in the anycast communication, the respective device will respond to the synchronization request within a predefined temporal interval. In a non-limiting embodiment, the second device is the receiving device with the highest path priority and will send a message at the second frequency during the earliest temporal interval via the unicast transmission protocol indicating acceptance of the synchronization request. Since this message is being sent at the second frequency, any device that has hopped to the second frequency will be potentially able to receive the message and may hop back to another frequency to continue performing their other functions when an earlier response message is heard. At this point where the transmitted acknowledgment is received by the initiating device, the second device will be synchronized. The initiating device can then send the communication to the second device at the second or multiple frequencies, with the initiating device and the second device hopping across a pseudo-random series of frequencies wherein the initiating device will forward the communication to the second device. In a non-limiting embodiment, the communication is broken into multiple frames or data packets and forwarded at multiple frequencies.

In a non-limiting embodiment, an initiating device may forward different communications at different stages of process 500. For instance, upon determining at step 504 that the first choice intermediate device failed to send a response to the initiating device indicating an acceptance of the synchronization request, the initiating device might forward another communication, which includes a log of this failure or unavailability of the first choice intermediate device, to the gateway. Accordingly, the communication initially intended by the initiating device to be sent to the first choice intermediate device will include different information from the communication that includes the log and is ultimately forwarded to the gateway via an alternative pathway. However, in another non-limiting embodiment, this may not be the case, and the communications forwarded to the first choice intermediate device and the other devices in the network will be identical.

In a non-limiting embodiment, process 500 may be performed by any device in the network. For instance, process 500 may be performed by an initiating device attempting to forward outage notification data regarding itself to a target destination. In another non-limiting embodiment, process 500 may be performed by an intermediate device that is attempting to forward a communication received by an initiating device or another intermediate device in a routing pathway.

Figure 6:
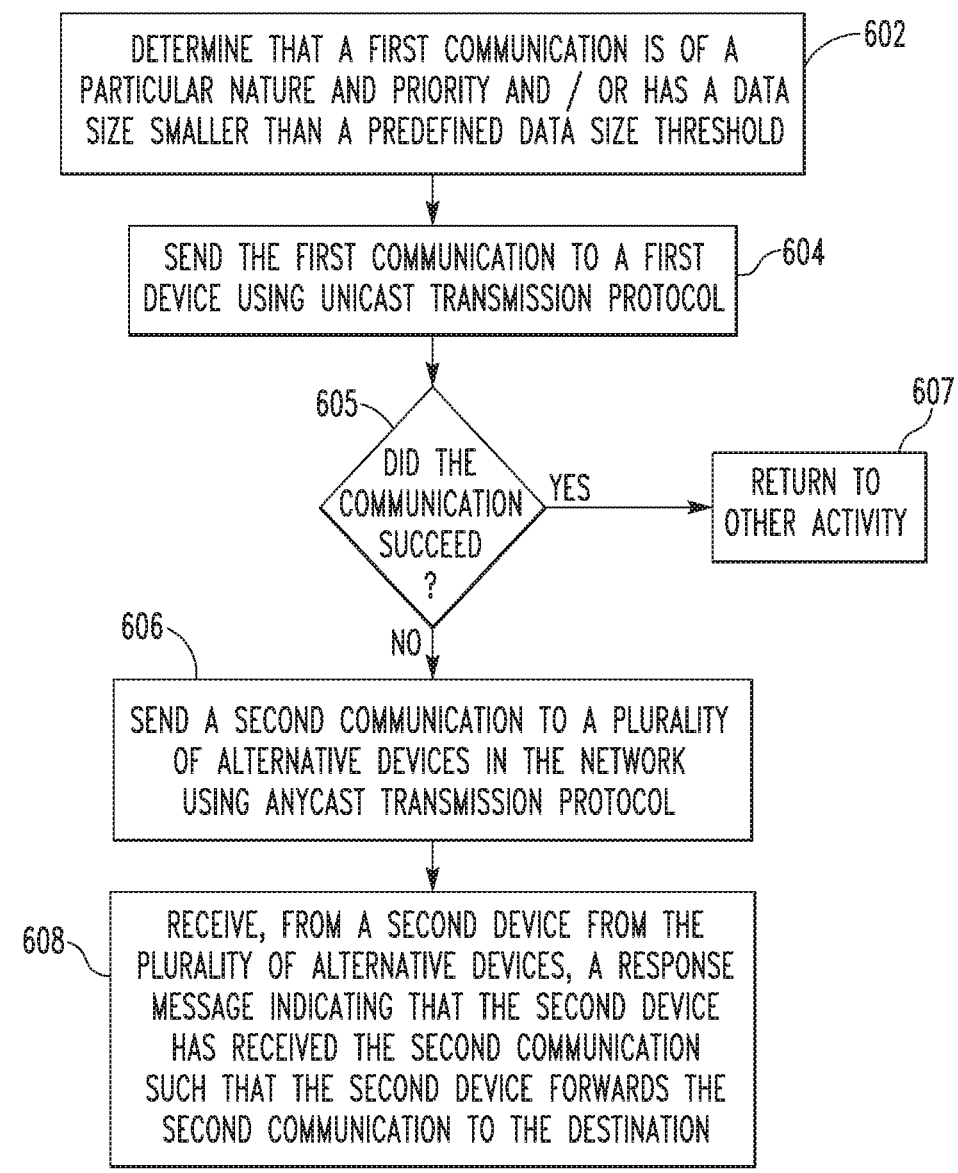
FIG. 6 is an illustrative flowchart of another process for facilitating communications in an ad-hoc multi-hop wireless network during outage conditions where the communications are of a particular data size, in accordance with an embodiment of the disclosed concept.

FIG. 6 is an illustrative flowchart of another process 600 for facilitating communications in an ad-hoc multi-hop wireless network during outage conditions where the communications are of a particular data size, in accordance with an embodiment of the disclosed concept. At step 602, an initiating device determines that a communication is of a particular nature and priority and/or has data size smaller than a predefined data size threshold. At step 604, the initiating device attempts to send the communication to the intended destination via the first choice intermediate using a direct message transmission and unicast protocol. At step 604, the initiating device thus forwards the communication to a first device, and awaits a response. At step 605, the initiating device will detect whether the communication was received. If the communication was received, then the initiating device will return to other activity at step 607. In the event of a failure of the initiating device to receive a response message indicating successful receipt of the communication by the intended first choice intermediate device, the process will move to step 606. At step 606, the initiating device attempts to send the communication to any potentially available and qualifying candidate alternative intermediate devices using an anycast protocol. At step 608, the initiating device receives, from a second device, a message indicating that the second device has accepted the communication such that the second device forwards the communication to the intended destination.

In a non-limiting embodiment, at step 602, an initiating device has determined that a first communication has a data size smaller than a predefined data size threshold that permits a direct message communication. In a non-limiting embodiment, an initiating device may determine, either alternatively or additionally, that a first communication meets a given requirement of importance and/or priority. In a non-limiting embodiment, in the event of an outage, the initiating device will initially attempt to use its first choice intermediate device (based on, as noted above in other embodiments, prior routing exchanges) to forward a communication to a gateway device, as it would do under normal operating circumstances. As such, it will forward the communication to the first choice intermediate device and await a response. If the first choice intermediate device is unavailable for forwarding the communication to the gateway, then the initiating device will not receive a response within a predefined temporal interval. If this occurs, the initiating device will autonomously seek out alternative pathways to forward the communication to the gateway.

In another non-limiting embodiment, devices that receive the direct message communication from the initiating device will determine their respective path priority for sending the communication to the gateway. In a non-limiting embodiment, the first device has the lowest path priority. Accordingly, at step 608, a second device will send a response message indicating its acceptance of the communication such that the second device forwards the communication to the gateway. This message will also serve as a signal to the other devices in the network that they need not respond to the received anycast transmission, which would merely forward duplicative communications to the gateway.

In a non-limiting embodiment, process 600 is performed using frequency hopping techniques known in the art. For instance, the initiating device will send the communication to other devices in the network at a first of at least one frequency and hop to a second frequency to await a response. Devices that are capable of forwarding the communication to the gateway, such as the second device, will hop to the second frequency upon successful receipt of the communications message. In a non-limiting embodiment, the second device has the highest path priority and will send a response message at the second frequency. This message will signal to any other device in the network that is listening on the second frequency that the second device will take on the responsibility of forwarding the communication to the gateway. In a non-limiting embodiment, more than one device may simply forward the communication to the gateway independent of one another.

In a non-limiting embodiment, an initiating device may forward different communications at different stages of process 600. For instance, upon determining that the primary intermediate device failed to facilitate the communication to a gateway, the initiating device might forward another communication, which includes a log of this failure, to the gateway. Accordingly, the initial communication forwarded to the primary intermediate device and the subsequent communication, including the log, will include different information. However, in another non-limiting embodiment, this may not be the case, and the communications sent to the primary intermediate device and the other devices in the network will be identical.

In a non-limiting embodiment, process 600 may be performed by any device in the network. For instance, process 600 may be performed by an initiating device attempting to forward outage data regarding itself to a target destination. In another non-limiting embodiment, process 600 may be performed by an intermediate device that is attempting to forward a communication received by an initiating device or another intermediate device in a routing pathway.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method, comprising:
   sending, from an initiating device, a first unicast transmission to a first device, the first unicast transmission being a first synchronization request;
   determining that the first synchronization request has failed; sending a first anycast transmission to a plurality of additional devices, the plurality of additional devices being within radio range of the initiating device such that the plurality of additional devices are configured to receiving anycast transmissions, the first anycast transmission being a second synchronization request;
   receiving, from a second device of the plurality, a first response message indicating that the second device has accepted the second synchronization request and is configured to being used to facilitate communications directed towards a destination device;
   sending a second unicast transmission to the second device from the initiating device, the second unicast transmission message being a communication directed to the destination device: and
   determining, in response to determining that the first synchronization request has failed, that the communication has a priority greater than a predefined priority level indicating that an anycast transmission message is to be used for attempting to facilitate the communication being sent to the destination device.

2. The method of claim 1, wherein determining comprises: determining that a response to the first synchronization request was not received within a predefined amount of time.

3. The method of claim 1, wherein determining comprises: receiving a notification from an intended target device indicating that the first unicast transmission was rejected.

4. The method of claim 1, wherein the first response message indicates, at least, a first path priority associated with the second device accessing the destination device.

5. The method of claim 1, wherein receiving the first response message further comprises: receiving the first response message within a predetermined amount of time based, at least in part, on the first path priority.

6. The method of claim 5, wherein the first path priority comprises at least one of: a path cost associated with the second device; and a power level associated with the second device.

7. The method of claim 1, further comprising: receiving, in response to sending the first anycast transmission, at least a second response message indicating that a third device of the plurality has received the first anycast transmission.

8. The method of claim 7, wherein the first response message indicates a first path priority associated with the second device, and the second response message indicates a second path priority associated with the third device, the method further comprises:
determining a path priority difference between the first path cost and the second path priority;
and determining, based on the path priority difference, that the second unicast transmission message is to be sent to the second device.

9. The method of claim 1, further comprising:
storing routing information associated with the second device within a routing table for the initiating device such that subsequent communications will be routed from the initiating device to the destination device via the second device.

10. The method of claim 1, further comprising:
causing, in response to receiving the first response message, the initiating device to synchronize with the second device such that the initiating device and the second device are structured to communicate with one another using at least one frequency.

11. A method, comprising:
sending, from an initiating device, a first unicast transmission to a first device, the first unicast transmission being a first synchronization request;
determining that the first synchronization request has failed; sending a first anycast transmission to a plurality of additional devices, the plurality of additional devices being within radio range of the initiating device such that the plurality of additional devices are configured to receiving anycast transmissions, the first anycast transmission being a second synchronization request;
receiving, from a second device of the plurality of additional devices, a first response message indicating that the second device has accepted the second synchronization request and is configured to being used to facilitate communications directed towards a destination device;
sending a second unicast transmission to the second device from the initiating device, the second unicast transmission message being a communication directed to the destination device; and
receiving, in response to sending the first anycast transmission, at least a second response message indicating that a third device of the plurality of additional devices has received the first anycast transmission, wherein the first response message indicates a first path priority associated with the second device, and the second response message indicates a second path priority associated with the third device, the method further comprises: determining that the first path priority is greater than the second path priority such that the second device is to be used to send the communication.

12. The method of claim 11, wherein:
the first path priority comprises at least a first path cost associated with second device, and a first power level associated with the second device; and
the second path priority comprises a second path cost associated with the third device, and a second power level associated with the third device.

13. A method, comprising:
determining that a first message has a data size less than a predefined data size threshold;
sending, from an initiating device a first unicast transmission communication representing the first message to a first device;
determining that the first unicast transmission communication failed; sending a first anycast transmission communication representing the first message to a plurality of additional devices, the plurality of additional devices being within radio range of the initiating device such that the plurality of additional devices are configured to receiving anycast transmission messages;
receiving, from a second device of the plurality of additional devices, a first response message indicating that the second device has received the first anycast transmission communication such that the second device is configured to being used to facilitate communications with a destination device; and
determining, in response to determining that the first synchronization request has failed, that the communication has a priority greater than a predefined priority level indicating that an anycast transmission message is to be used for attempting to facilitate the communication being sent to the destination device.

14. The method of claim 13, further comprising:
storing, in response to receiving the first response message, routing information associated with the second device within a routing table for the initiating device such that subsequent communications will be routed from the initiating device to the destination device via the second device.

15. The method of claim 13, further comprising:
determining, prior to sending the first unicast transmission communication, that the first message has a priority higher than a predefined priority level.

16. The method of claim 13, wherein receiving the first response message further comprises: receiving a first path priority and message confirmation associated with the second device.

17. The method of claim 13, wherein receiving the first response message further comprises: receiving the first response message within a predetermined temporal interval based, at least in part, on a first path priority associated with the second device accessing the destination device.

18. The method of claim 17, wherein the first path priority comprises at least:
a path cost associated with the second device; and a power level associated with the second device.

19. The method of claim 13, wherein determining that the first unicast transmission communication failed comprises:

determining that a confirmation message, indicating that the first unicast transmission was successful, was not received within a predefined amount of time.

* * * * *